(12) United States Patent
Hashizume

(10) Patent No.: US 12,157,194 B2
(45) Date of Patent: Dec. 3, 2024

(54) BEARING APPARATUS

(71) Applicant: NTN Corporation, Osaka (JP)

(72) Inventor: Shohei Hashizume, Kuwana (JP)

(73) Assignee: NTN Corporation, Osaka (JP)

( * ) Notice: Subject to any disclaimer, the term of this patent is extended or adjusted under 35 U.S.C. 154(b) by 81 days.

(21) Appl. No.: 18/022,734

(22) PCT Filed: Sep. 8, 2021

(86) PCT No.: PCT/JP2021/032960
§ 371 (c)(1),
(2) Date: Feb. 22, 2023

(87) PCT Pub. No.: WO2022/059573
PCT Pub. Date: Mar. 24, 2022

(65) Prior Publication Data
US 2023/0311257 A1  Oct. 5, 2023

(30) Foreign Application Priority Data

Sep. 16, 2020 (JP) .................. 2020-155151

(51) Int. Cl.
*F16C 19/16* (2006.01)
*B23Q 1/70* (2006.01)
(Continued)

(52) U.S. Cl.
CPC ............. *B23Q 1/70* (2013.01); *B23Q 11/123* (2013.01); *F16C 19/525* (2013.01); *F16C 33/6662* (2013.01); *F16C 33/6681* (2013.01); *F16C 19/163* (2013.01); *F16C 19/548* (2013.01); *F16C 2233/00* (2013.01)

(58) Field of Classification Search
CPC .... F16C 19/163; F16C 19/525; F16C 19/546; F16C 19/547; F16C 19/548; F16C 33/38; F16C 33/6662; F16C 33/6681; F16C 2233/00; F16C 2322/39; B23Q 1/70; B23Q 11/123
See application file for complete search history.

(56) References Cited

U.S. PATENT DOCUMENTS

2018/0372159 A1* 12/2018 Friedrich .............. F16C 19/547

FOREIGN PATENT DOCUMENTS

EP        3754218 A1    12/2020
JP     2016-166832 A     9/2016
(Continued)

OTHER PUBLICATIONS

International Search Report issued in International Application No. PCT/JP2021/032960, dated Nov. 22, 2021, with English translation.

*Primary Examiner* — Phillip A Johnson
(74) *Attorney, Agent, or Firm* — Rimon P.C.

(57) ABSTRACT

A bearing apparatus includes a bearing that rotatably supports a main spindle around a rotation axis, a spacer including an inner-ring spacer adjacent to an inner ring of the bearing and an outer-ring spacer adjacent to an outer ring, and a heat flux sensor provided in an inside surface of the outer-ring spacer. A distance in a direction along the rotation axis from a center of the bearing to a center of the heat flux sensor is longer than 0.5 time and shorter than one time of a dimension of the bearing in the direction along the rotation axis.

8 Claims, 17 Drawing Sheets

(51) Int. Cl.
    *B23Q 11/12*     (2006.01)
    *F16C 19/52*     (2006.01)
    *F16C 19/54*     (2006.01)
    *F16C 33/66*     (2006.01)

(56) References Cited

FOREIGN PATENT DOCUMENTS

| | | | | |
|---|---|---|---|---|
| JP | 2017-026078 A | | 2/2017 | |
| JP | 2020037963 A | * | 3/2020 | ............ F16C 19/16 |
| JP | 2020133889 A | * | 8/2020 | |
| WO | WO-2019159838 A1 | * | 8/2019 | ............ F16C 19/163 |
| WO | 2020/166542 A1 | | 8/2020 | |

* cited by examiner

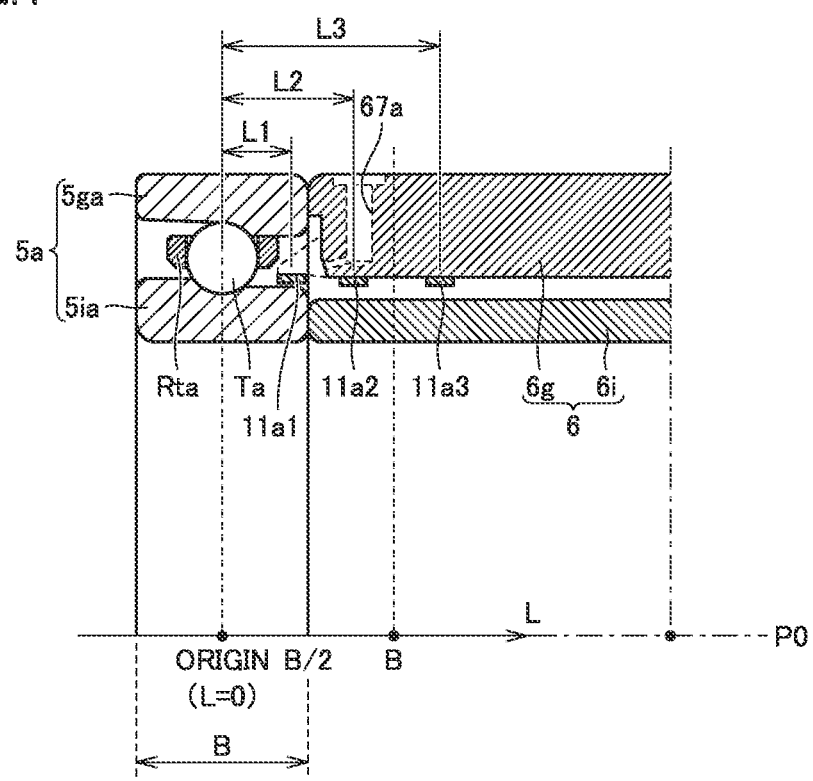

FIG.5

CONDITION IN BEARING ABNORMALITY SIMULATION TEST

| TESTED BEARING | $\phi 70 \times \phi 100 \times 20$<br>5S-2LA-HSE014 EQUIVALENT<br>(CERAMIC-BALL-INCORPORATING SUPER-HIGH-SPEED ANGULAR CONTACT BALL BEARING) |
|---|---|
| PRELOADING METHOD | FIXED POSITION PRELOADING (MOUNTED PRELOAD OF 750 N) |
| ROTATION SPEED | $16000 \text{min}^{-1}$ FIXED |
| LUBRICATION METHOD | INJECTION OF SEVERAL DROPS OF LUBRICATING OIL ONLY AT THE TIME OF ASSEMBLY OF MAIN SPINDLE (OIL NOT BEING FED DURING OPERATION OF MAIN SPINDLE) |
| BEARING JACKET COOLING | YES, SYNCHRONOUS WITH ROOM TEMPERATURE |
| SPINDLE ORIENTATION | HORIZONTAL |

FIG.6

RELATION BETWEEN ARRANGEMENT IN AXIAL DIRECTION
OF HEAT FLUX SENSOR AND OUTPUT SENSITIVITY

| L | ARRANGEMENT IN AXIAL DIRECTION OF HEAT FLUX SENSOR | SENSOR OUTPUT SENSITIVITY | REMARKS |
|---|---|---|---|
| L1 | $L1 \leq B/2$ | × | SENSITIVITY BECOMES DULL UNDER INFLUENCE BY AIR INJECTED FROM LUBRICATION NOZZLE OR AIR CURTAIN PRODUCED BY HIGH-SPEED ROTATION OF BEARING |
| L2 | $B/2 < L2 < B$ | ○ | SENSOR IS NOT AFFECTED BY AIR, AND CAN DETECT HEAT GENERATION IN BEARING ON THE OCCURRENCE OF ABNORMALITY EARLIER (WITH HIGHER SENSITIVITY) |
| L3 | $B \leq L3$ | △ | THOUGH SENSOR IS NOT AFFECTED BY AIR, SENSITIVITY SLIGHTLY BECOMES DULL BECAUSE SENSOR IS DISTANT FROM BEARING |

FIG.10

RELATION BETWEEN ARRANGEMENT IN RADIAL DIRECTION
OF HEAT FLUX SENSOR AND OUTPUT SENSITIVITY

| $\Delta P$ | ARRANGEMENT IN RADIAL DIRECTION OF HEAT FLUX SENSOR | SENSOR OUTPUT SENSITIVITY | REMARKS |
|---|---|---|---|
| $\Delta P1$ | $\Delta P1 \leq (\frac{D_o}{2} - \frac{d_i}{2}) \times 0.25$ | ○ | SENSOR IS CLOSE TO INNER RING THAT GENERATES HEAT, AND CAN DETECT HEAT GENERATION IN BEARING ON THE OCCURRENCE OF ABNORMALITY EARLIER (WITH HIGHER SENSITIVITY) |
| $\Delta P2$ | $(\frac{D_o}{2} - \frac{d_i}{2}) \times 0.25 < \Delta P2$ | △ | SENSITIVITY SLIGHTLY BECOMES DULL BECAUSE SENSOR IS DISTANT FROM INNER RING THAT GENERATES HEAT |

FIG.13

RELATION BETWEEN ARRANGEMENT IN CIRCUMFERENTIAL DIRECTION OF HEAT FLUX SENSOR AND OUTPUT SENSITIVITY

| $\theta, \beta$ | ARRANGEMENT IN CIRCUMFERENTIAL DIRECTION OF HEAT FLUX SENSOR | SENSOR OUTPUT SENSITIVITY | REMARKS |
|---|---|---|---|
| $\theta 1$ | $-15° < \theta 1 < 0$ | × | SENSITIVITY BECOMES DULLER BECAUSE OF INFLUENCE BY AIR INJECTED FROM LUBRICATION NOZZLE AND ARRANGEMENT OF SENSOR IN DIRECTION OF ROTATION OF INNER-RING SPACER |
| $\theta 2$ | $0 < \theta 2 < 15°$ | × | SENSITIVITY BECOMES DULL UNDER INFLUENCE BY AIR INJECTED FROM LUBRICATION NOZZLE |
| $\theta 3$ | $-90° < \theta 3 < -15°$ | △ | SINCE SENSOR IS ARRANGED IN DIRECTION OF ROTATION OF INNER-RING SPACER, IT IS SLIGHTLY AFFECTED BY AIR INJECTED FROM LUBRICATION NOZZLE AND SENSITIVITY SLIGHTLY BECOMES DULL |
| $\theta 4$ | $15° < \theta 4 < 90°$ | ○ | SENSOR IS NOT AFFECTED BY AIR, AND CAN DETECT HEAT GENERATION IN BEARING ON THE OCCURRENCE OF ABNORMALITY EARLIER (WITH HIGHER SENSITIVITY) |
| $\beta 1$ | $-90° < \beta 1 < 90°$ | ◎ | SENSOR IS NOT AFFECTED BY AIR AND IS PROVIDED AROUND EXHAUST PORT WHERE HEAT TENDS TO BE TRAPPED, AND HENCE CAN DETECT HEAT GENERATION IN BEARING ON THE OCCURRENCE OF ABNORMALITY EARLIER (WITH HIGHER SENSITIVITY) |

BEARING APPARATUS

CROSS-REFERENCE OF RELATED APPLICATIONS

This application is the U.S. National Phase under 35 U.S.C. § 371 of International Patent Application No. PCT/JP2021/032960, filed on Sep. 8, 2021, which in turn claims the benefit of Japanese Patent Application No. 2020-155151, filed on Sep. 16, 2020, the entire disclosures of which Applications are incorporated by reference herein.

TECHNICAL FIELD

This invention relates to a bearing apparatus that rotatably supports a main spindle or the like of a machine tool.

BACKGROUND ART

A bearing for a main spindle of a machine tool is often used at a high speed and under low load, and an angular contact ball bearing is widely employed for such a bearing. The bearing for the main spindle of the machine tool is lubricated by air-oil (oil-mist) lubrication or grease lubrication. Air-oil lubrication is characterized in ability to maintain a stable lubricated state for a long period of time because of external supply of lubricating oil. Grease lubrication is characterized in excellent cost efficiency because of requirement of neither of an annexed facility and a pipe and in environmental friendliness because of an extremely small amount of generation of mist.

A bearing used in a higher-speed region such as a region where a dn value calculated by multiplying an inner diameter of an inner ring by the number of rotations is equal to or larger than one million as in a main spindle of a machining center among machine tools should operate in a more stable manner. For various factors described below, however, the bearing may undergo surface roughening or peeling at a bearing raceway surface or abnormality of a retainer, and thereafter a temperature of the bearing may excessively increase.

Inappropriate feed and drain of lubricating oil in air-oil lubrication (excessively small or large amount of oil or insufficient exhaust)

Deterioration of lubricating grease sealed in bearing

Entry of coolant or water or a foreign matter into a bearing rolling portion

Oil film rupture due to excessive preload, that is, increase in contact pressure in rolling portion In order to prevent excessive temperature increase in the bearing due to the above factors, Japanese Patent Laying-Open No. 2017-26078 (PTL 1) discloses such a technique that a lubricating oil feed pump and a contactless temperature sensor are contained in a spacer adjacent to a bearing and the lubricating oil feed pump feeds lubricating oil to the inside of the bearing in accordance with a temperature value of a bearing lubricated portion measured by the temperature sensor.

For example, Japanese Patent Laying Open No. 2016-166832 (PTL 2) discloses a heat flux sensor that senses a heat flux generated by a temperature difference between a front side and a rear side of the sensor, rather than change in temperature. The heat flux sensor is characterized in higher sensitivity and higher reaction speed of a sensor output than a temperature sensor (a contactless temperature sensor or a thermocouple) used in measurement of a temperature of inner and outer rings of a bearing.

CITATION LIST

Patent Literature

PTL 1: Japanese Patent Laying-Open No. 2017-26078
PTL 2: Japanese Patent Laying Open No. 2016-166832

SUMMARY OF INVENTION

Technical Problem

In a bearing, under the influence by an air curtain produced by rotation of the bearing or the influence by compressed air injected from a nozzle for air-oil lubrication, a flow of air in the bearing may become great. Therefore, when change in temperature in the inside of the bearing is to be sensed in an early stage with the use of a heat flux sensor, depending on a position of the heat flux sensor, there is a concern about lowering in sensitivity of the heat flux sensor.

The present invention was made to solve the problem above, and an object thereof is to achieve high sensitivity of a heat flux sensor contained in a bearing apparatus even in an environment where a flow of air in a bearing is varied by rotation of the bearing or injection of air-oil.

Solution to Problem (1) A bearing apparatus according to the present disclosure includes a bearing including an inner ring, an outer ring, a rolling element, and a retainer, the bearing rotatably supporting a rotating body around a rotation axis, a spacer including an inner-ring spacer adjacent to the inner ring and an outer-ring spacer adjacent to the outer ring, and a heat flux sensor provided in one of the spacer and a component around the bearing. A distance in a direction along the rotation axis from a center of the bearing to a center of the heat flux sensor is longer than 0.5 time and shorter than one time of a dimension of the bearing in the direction along the rotation axis.

(2) In one aspect, a distance in a radial direction of the rotation axis from an outside surface of the inner-ring spacer to the heat flux sensor is equal to or shorter than 25% of a distance between an inside surface of the inner-ring spacer and an outside surface of the outer-ring spacer.

(3) In one aspect, the heat flux sensor is provided in an inside surface of the outer-ring spacer. The outer-ring spacer is provided with an exhaust port for exhaust of air-oil for lubrication. Magnitude of an angle in a circumferential direction of the rotation axis from a center of the exhaust port to the center of the heat flux sensor is smaller than 90°.

(4) In one aspect, the outer-ring spacer is provided with a nozzle that injects the air-oil. The nozzle is provided in a region in the outer-ring spacer opposite to the exhaust port.

(5) Another bearing apparatus according to the present disclosure includes a bearing including an inner ring, an outer ring, a rolling element, and a retainer, the bearing rotatably supporting a rotating body around a rotation axis, a spacer including an inner-ring spacer adjacent to the inner ring and an outer-ring spacer adjacent to the outer ring, and a heat flux sensor provided in one of the spacer and a component around the bearing. A distance in a radial direction of the rotation axis from an outside surface of the inner-ring spacer to the heat flux sensor is equal to or shorter than 25% of a distance between an inside surface of the inner-ring spacer and an outside surface of the outer-ring spacer.

(6) Another bearing apparatus according to the present disclosure includes a bearing including an inner ring, an outer ring, a rolling element, and a retainer, the bearing rotatably supporting a rotating body around a rotation axis, a spacer including an inner-ring spacer adjacent to the inner ring and an outer-ring spacer adjacent to the outer ring, and a heat flux sensor provided in one of the spacer and a component around the bearing. The heat flux sensor is provided in an inside surface of the outer-ring spacer. The outer-ring spacer is provided with an exhaust port for exhaust of air-oil for lubrication. Magnitude of an angle in a circumferential direction of the rotation axis from a center of the exhaust port to a center of the heat flux sensor is smaller than 90°.

(7) In one aspect, the outer-ring spacer is provided with a cooling medium flow channel.

(8) In one aspect, the rotating body is a main spindle of a machine tool.

Advantageous Effects of Invention

According to this construction, even in an environment where a flow of air in a bearing is varied by rotation of the bearing or injection of air-oil, sensitivity of a heat flux sensor contained in a bearing apparatus can be high.

BRIEF DESCRIPTION OF DRAWINGS

FIG. 4 is a diagram showing exemplary arrangement when arrangement in an axial direction of a heat flux sensor is varied.

FIG. 5 is a diagram showing a condition in a bearing abnormality simulation test.

FIG. 6 is a diagram showing relation between arrangement in an axial direction of each heat flux sensor and output sensitivity of each heat flux sensor.

FIG. 10 shows relation between arrangement in the radial direction of each heat flux sensor and output sensitivity of each heat flux sensor.

FIG. 13 shows relation between arrangement in the circumferential direction of each heat flux sensor and output sensitivity of each heat flux sensor.

DESCRIPTION OF EMBODIMENTS

Figure 1:
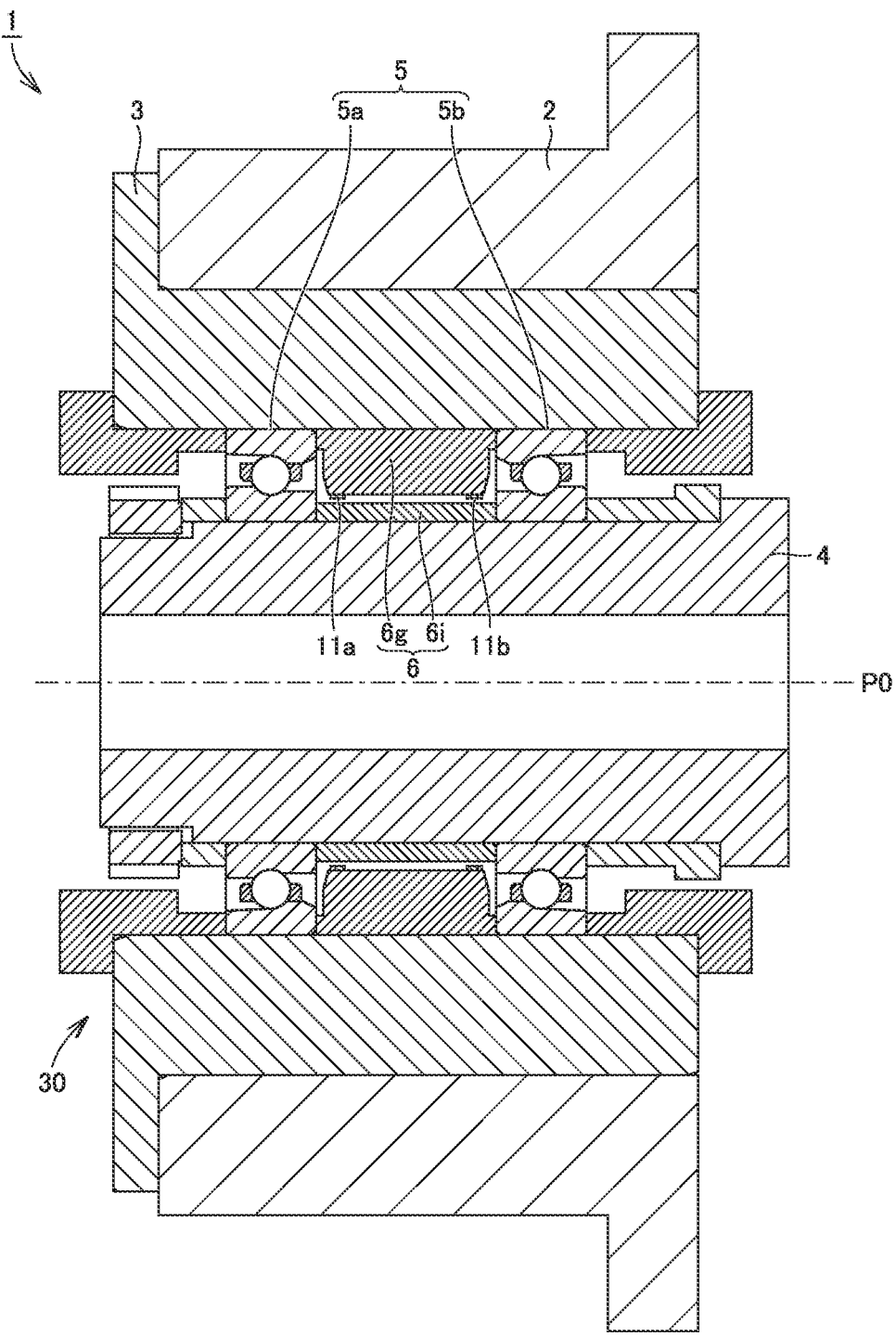
FIG. 1 is a cross-sectional view showing a schematic construction of a spindle apparatus in which a bearing apparatus is incorporated.

An embodiment of the present invention will be described below with reference to the drawings. The same or corresponding elements in the drawings below have the same reference characters allotted and description thereof will not be repeated.

Figure 2:
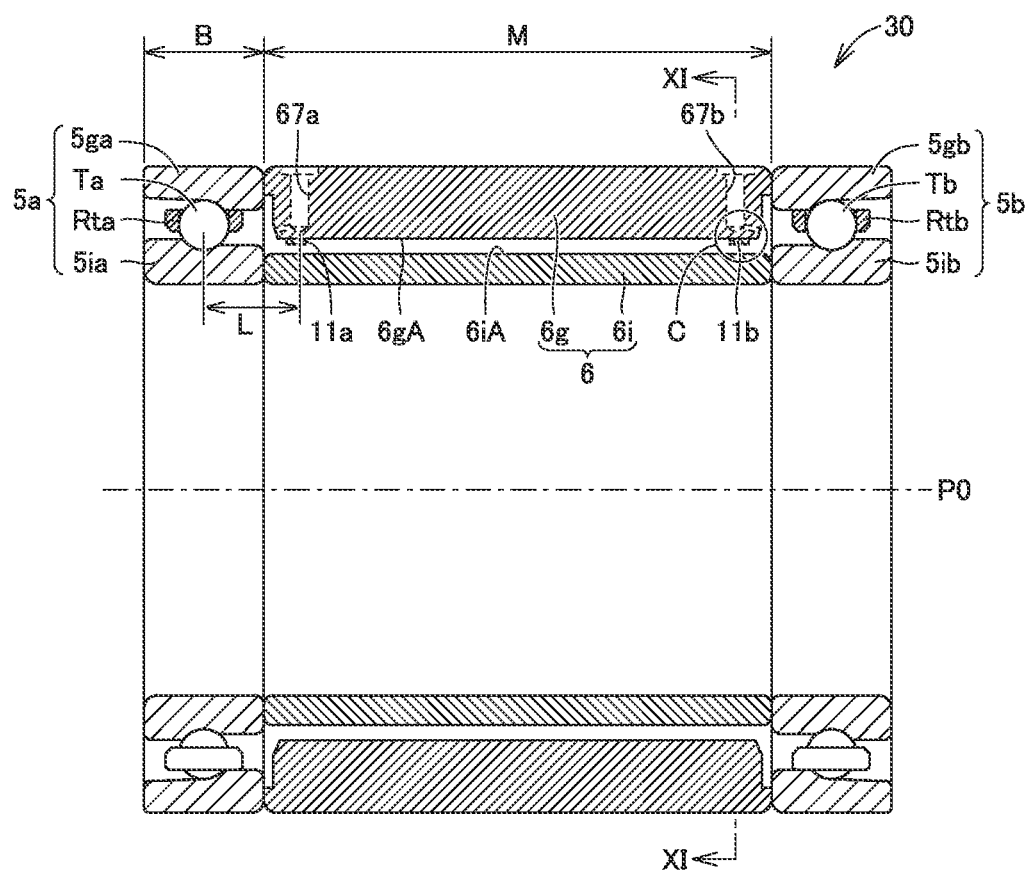
FIG. 2 is a schematic cross-sectional view showing a construction of the bearing apparatus.

FIG. 1 is a cross-sectional view showing a schematic construction of a spindle apparatus 1 in which a bearing apparatus 30 according to the present embodiment is incorporated FIG. 2 is a schematic cross-sectional view showing a construction of bearing apparatus 30 according to the present embodiment.

Spindle apparatus 1 shown in FIG. 1 is used, for example, as a built-in motor type spindle apparatus of a machine tool. In this case, a not-shown motor is incorporated on one end side (left side in FIG. 1) of a main spindle 4 which is a rotating body supported by spindle apparatus 1 for a main spindle of a machine tool, and a not-shown cutting tool such as an end mill is connected to the other end side (right side in FIG. 1).

Spindle apparatus 1 includes a bearing 5 including two bearings 5a and 5b, a spacer 6 arranged adjacently to bearings 5a and 5b, and heat flux sensors 11a and 11b. Main spindle 4 is supported rotatably around a rotation axis P0 by two bearings 5a and 5b provided in a housing 3 embedded in an inside portion of a bearing jacket 2. Bearing 5a includes an inner ring 5ia, an outer ring 5ga, a rolling element Ta, and a retainer Rta. Bearing 5b includes an inner ring 5ib, an outer ring 5gb, a rolling element Tb, and a retainer Rtb. Spacer 6 includes an inner-ring spacer 6i and an outer-ring spacer 6g.

Inner ring 5ia of bearing 5a and inner ring 5ib of bearing 5b that are distant in an axial direction (a direction along rotation axis P0) are fitted to main spindle 4 by interference fit (press-fitting). Inner-ring spacer 6i is arranged between inner rings 5ia and 5ib and outer-ring spacer 6g is arranged between outer rings 5ga and 5gb.

Bearing 5a is a rolling bearing in which a plurality of rolling elements Ta are arranged between inner ring 5ia and outer ring 5ga. Intervals between rolling elements Ta are held by retainer Rta. Bearing 5b is a rolling bearing in which a plurality of rolling elements Tb are arranged between inner ring 5ib and outer ring 5gb. Intervals between rolling elements Tb are held by retainer Rtb.

An angular contact ball bearing, a deep groove ball bearing, or a tapered roller bearing can be employed as bearings 5a and 5b. The angular contact ball bearing is included in bearing apparatus 30 shown in FIGS. 1 and 2, where two bearings 5a and 5b are provided in back-to-back duplex bearing (DB) arrangement. Arrangement of the bearing is not limited to back-to-back duplex bearing arrangement, and for example, face-to-face duplex bearing arrangement may be applicable.

Though a structure in which two bearings 5a and 5b support main spindle 4 is illustrated and described, a structure in which three or more bearings support main spindle 4 may be applicable.

A not-shown cooling medium flow channel is provided in the inside of housing 3. By feeding a cooling medium through the cooling medium flow channel in housing 3, bearings 5a and 5b can be cooled.

In spindle apparatus 1 according to the present embodiment, as shown in FIG. 2, lubricating oil supply paths 67a and 67b for injecting lubricating oil to bearings 5a and 5b for cooling and lubrication of bearings 5a and 5b are provided in outer-ring spacer 6g. Lubricating oil is injected in a state of air-oil or oil mist together with air that carries lubricating oil from a nozzle (which will also simply be referred to as a "lubrication nozzle" below) provided at each of tip ends of lubricating oil supply paths 67a and 67b.

Though FIG. 2 shows lubricating oil supply paths 67a and 67b (lubrication nozzles) at positions proximate to respective heat flux sensors 11a and 11b, lubricating oil supply paths 67a and 67b are actually arranged at positions displaced in a circumferential direction from heat flux sensors 11a and 11b (see FIG. 11 which will be described later) FIG. 1 does not show lubricating oil supply paths 67a and 67h for the sake of brevity.

Heat flux sensors 11a and 11b that measure a heat flux are fixed to an inside surface 6gA of outer-ring spacer 6g and are opposed to an outside surface 6iA of inner-ring spacer 6i. The heat flux refers to a quantity of heat that passes through a unit area per unit time.

Each of heat flux sensors 11a and 11b is a sensor that converts a heat flux into an electrical signal based on a Seebeck effect, and an output voltage is generated from a slight temperature difference between a front side and a rear side of the sensor. Heat flux sensors 11a and 11b are each more sensitive to variation in heat in the inside of the bearing than a temperature sensor such as a contactless temperature sensor or a thermocouple, and they timely follow variation in heat in the inside of the bearing.

Heat flux sensor 11a is arranged in inside surface 6gA of outer-ring spacer 6g, at an end on a side of bearing 5a in an axial direction. Heat flux sensor 11b is arranged in inside surface 6gA of outer-ring spacer 6g, at an end on a side of bearing 5b in the axial direction. Since heat flux sensors 11a and 11b are thus provided in the vicinity of respective bearings 5a and 5b in outer-ring spacer 6g, heat flux sensors 11a and 11b can directly detect a heat flux of heat that flows between the inner ring and the outer ring of bearings 5a and 5b. Arrangement of heat flux sensors 11a and 11b will be described later in detail.

In an attempt to measure a temperature of inner rings 5ia and 5ib, outer rings 5ga and 5gb, and spacer 6 for detecting a sign of seizure of bearings 5a and 5b, in spite of abrupt heat generation, the sign may not be detected in an early stage because of delay in increase in temperature.

In contrast, in the present embodiment, the sign of seizure of bearings 5a and 5b can be detected based on outputs from heat flux sensors 11a and 11b. By using the outputs from heat flux sensors 11a and 11b, abrupt heat generation can quickly be detected because heat flux starts to change earlier than the temperature.

Wires (not shown) for sending detection signals to a control device (not shown) are connected to respective heat flux sensors 11a and 11b.

<Acceleration and Slowdown Test>

The present applicant conducted an acceleration and slowdown test, in which the bearing apparatus according to the embodiment was incorporated in a tester simulating a main spindle of a machine tool and relation among a heat flux, a temperature, and a rotation speed at the time when the rotation speed of main spindle 4 was increased and decreased was evaluated.

Figure 3:
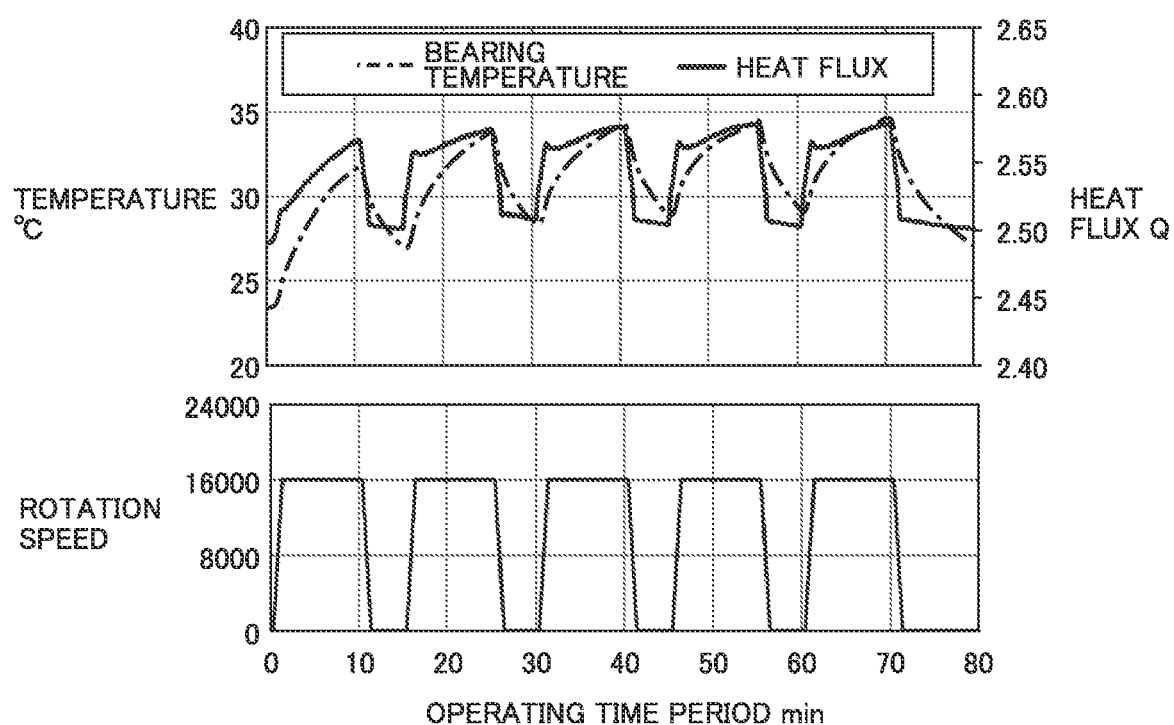
FIG. 3 is a diagram showing relation among a heat flux, a temperature, and a rotation speed obtained in an acceleration and slowdown test.

FIG. 3 is a diagram showing relation among a heat flux, a temperature, and a rotation speed obtained in an acceleration and slowdown test. As shown in FIG. 3, an output (heat flux) from the heat flux sensor is higher in responsiveness to increase and decrease in rotation speed than an output (temperature of the bearing) from the temperature sensor, and accuracy in detection of a sign of abnormality of the bearing may be improved. Timing of start of increase and decrease in output from the heat flux sensor is substantially synchronous with timing of start of increase and decrease in rotation speed.

In bearings 5a and 5b, under the influence by an air curtain produced by rotation of bearings 5a and 5b with rotation of main spindle 4 and influence by compressed air injected from the lubrication nozzle, a flow of air may become great. Therefore, depending on positions of heat flux sensors 11a and 11b, there is a concern about lowering in sensitivity of heat flux sensors 11a and 11b by being affected by the flow of air in bearings 5a and 5b.

When a difference in temperature between the front side and the rear side of heat flux sensors 11a and 11b is small as well, sensitivity of heat flux sensors 11a and 11b may be lowered. For example, in spindle apparatus 1 according to the present embodiment, bearings 5a and 5b can be cooled by feed of a cooling medium through the cooling medium flow channel in the inside of housing 3. When cooling is insufficient, however, the temperature difference between the inner ring and the outer ring of bearings 5a and 5b is less likely to be produced. Consequently, the temperature difference between the front side and the rear side of heat flux sensors 11a and 11b also becomes small and there is a concern about lowering in sensitivity of heat flux sensors 11a and 11b.

In view of aspects above, in the present embodiment, arrangement of heat flux sensors 11a and 11b is optimized in outer-ring spacer 6g so as to improve sensitivity of heat flux sensors 11a and 11b even in an environment where a flow of air in bearings 5a and 5b is varied by rotation of bearings 5a and 5b or injection of compressed air (air-oil) from the lubrication nozzle.

Furthermore, in the present embodiment, by providing a cooling structure not only in the inside of housing 3 but also in outer-ring spacer 6g where heat flux sensors 11a and 11b are arranged, surfaces (surfaces in contact with outer-ring spacer 6g) of heat flux sensors 11a and 11b opposite to surfaces on the side of main spindle 4 are positively cooled. Thus, when abrupt heat generation occurs in bearings 5a and 5b as in burning of bearings 5a and 5b, the temperature difference between the front side and the rear side of heat flux sensors 11a and 11b becomes greater and that abrupt heat generation can be detected early by heat flux sensors 11a and 11b.

Arrangement of heat flux sensors 11a and 11b and the cooling structure in outer-ring spacer 6g will be described below in detail.

<Arrangement in Axial Direction of Heat Flux Sensor>

FIG. 2 described above shows exemplary arrangement in the axial direction (the direction along rotation axis P0) of heat flux sensors 11a and 11b according to the present embodiment. Heat flux sensor 11a according to the present embodiment is arranged at a position where a relational expression (1) below is satisfied.

$$B/2 < L < M \qquad (1)$$

where "B" represents a dimension of a width (a length in the axial direction) of bearing 5a, "L" represents a distance from the center of bearing 5a to the center of heat flux sensor 11a, and "M" represents a dimension of a width (a length in the axial direction) of outer-ring spacer 6g.

Furthermore, heat flux sensor 11a according to the present embodiment is arranged at a position where a relational expression (2) below is satisfied.

$$B/2 < L < B \qquad (2)$$

The relational expression (2) is the same as the relational expression (1) with "M" being replaced with "B".

FIG. 4 is a diagram showing exemplary arrangement when arrangement in the axial direction of heat flux sensor 11a is varied. Specifically, FIG. 4 shows a heat flux sensor 11a1 arranged at a position where distance L from the center of bearing 5a is set to a "prescribed value L1," a heat flux sensor 11a2 arranged at a position where distance L from the center of bearing 5a is set to a "prescribed value L2," and a heat flux sensor 11a3 arranged at a position where distance L from the center of bearing 5a is set to a "prescribed value L3."

Prescribed value L1 satisfies a condition of L1 s B/2 and the relational expressions (1) and (2) are not satisfied. Prescribed value L2 satisfies a condition of B/2<L2<B, and the relational expressions (1) and (2) are satisfied. Prescribed value L3 satisfies a condition of L3% B, and the relational expression (1) is satisfied but the relational expression (2) is not satisfied.

The present applicant conducted a bearing abnormality occurrence simulation test in an attempt to check output sensitivity of each of heat flux sensors 11a1 to 11a3 shown in FIG. 4. FIG. 5 shows a condition in a bearing abnormality simulation test. In the present simulation test, by introducing a very small amount of lubricating oil into the rolling bearing only at the time of assembly of the main spindle, a situation where abnormality was likely to occur in a tested bearing was created.

FIG. 6 is a diagram showing relation between arrangement in the axial direction (distances L1 to L3 from the center of bearing 5a) of each heat flux sensor and output sensitivity of each heat flux sensor that is obtained in the simulation test conducted under the test condition shown in FIG. 5.

As shown in FIG. 6, regarding heat flux sensor 11a1 of which distance L1 from the center of bearing 5a satisfies the condition of L1 B/2, the relational expressions (1) and (2) are not satisfied and this heat flux sensor is poorest in output sensitivity. This may be because heat flux sensor 11a1 is most affected by air injected from the lubrication nozzle and the air curtain produced by high-speed rotation of bearings 5a and 5b and hence lowering in sensitivity of heat flux sensor 11a1 is greatest.

Regarding heat flux sensor 11a3 of which distance L3 from the center of bearing 5a satisfies the condition of L3≥B, the relational expression (1) is satisfied but the relational expression (2) is not satisfied, and the heat flux sensor is slightly poor in output sensitivity. This may be because the heat flux sensor is least likely to be affected by air injected from the lubrication nozzle and the air curtain produced by high-speed rotation of bearings 5a and 5b, however, it is most distant from bearing 5a and heat from bearing 5a is least likely to conduct thereto.

In contrast, regarding heat flux sensor 11a2 of which distance L2 from the center of bearing 5a satisfies the condition of B/2<L2<B, the relational expressions (1) and (2) are satisfied and the heat flux sensor is highest in output sensitivity. This may be because the heat flux sensor is less likely to be affected by air injected from the lubrication nozzle and the air curtain produced by high-speed rotation of bearings 5a and 5b, and it is also close to bearing 5a and hence able to detect heat generation in bearing 5a earliest (with highest sensitivity).

Heat flux sensor 11a according to the present embodiment is arranged at a position where the relational expressions (1) and (2) described above are satisfied. Therefore, even in an environment where the flow of air in bearing 5a is varied by rotation of bearing 5a or injection from the lubrication nozzle, sensitivity of heat flux sensor 11a can be high.

Heat flux sensor 11b according to the present embodiment is also arranged at a position where the relational expressions (1) and (2) described above are satisfied. Therefore, sensitivity of heat flux sensor 11b can also be high. When the relational expressions (1) and (2) described above are applied to heat flux sensor 11b, "B" represents a dimension of a width (a length in the axial direction) of bearing 5b and "L" represents a distance from the center of bearing 5b to the center of heat flux sensor 11b.

<Arrangement in Radial Direction of Heat Flux Sensor>

Figure 7:
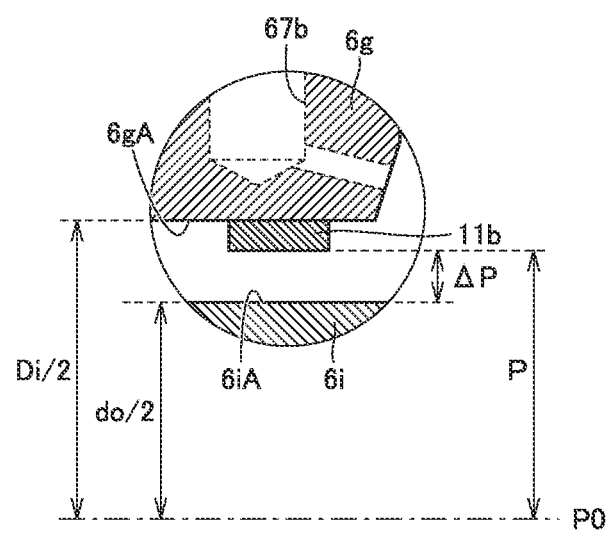
FIG. 7 is a diagram showing exemplary arrangement in a radial direction of the heat flux sensor.

FIG. 7 is a diagram showing exemplary arrangement in a radial direction (a radial direction of rotation axis P0) of heat flux sensor 11b. FIG. 7 is a partially enlarged view showing details of a C portion in FIG. 2.

Heat flux sensor 11b according to the present embodiment is arranged at a position where a relational expression (3) below is satisfied:

$$do/2 < P < Di/2 \qquad (3)$$

where "do" represents an outer diameter of inner-ring spacer 6i, "Di" represents an inner diameter of outer-ring spacer 6g, and "P" represents a distance from rotation axis P0 to heat flux sensor 11b.

Furthermore, heat flux sensor 11b according to the present embodiment is arranged at a position where a relational expression (4) below is satisfied:

$$0 < \Delta P \leq (Do/2 - di/2) \times 0.25 \qquad (4)$$

where "Do" represents an outer diameter of outer-ring spacer 6g, "di" represents an inner diameter of inner-ring spacer 6i, and "ΔP" represents a distance (=P−do/2) from outside surface 6iA of inner-ring spacer 6i to heat flux sensor 11b. The relational expression (4) means that the distance from outside surface 6iA of inner-ring spacer 6i to heat flux sensor 11b is longer than 0 and equal to or shorter than 25% of a distance between the inside surface of inner-ring spacer 6i and the outside surface of outer-ring spacer 6g (=Do/2−di/2, that is, the dimension in the radial direction of spacer 6).

Figure 8:
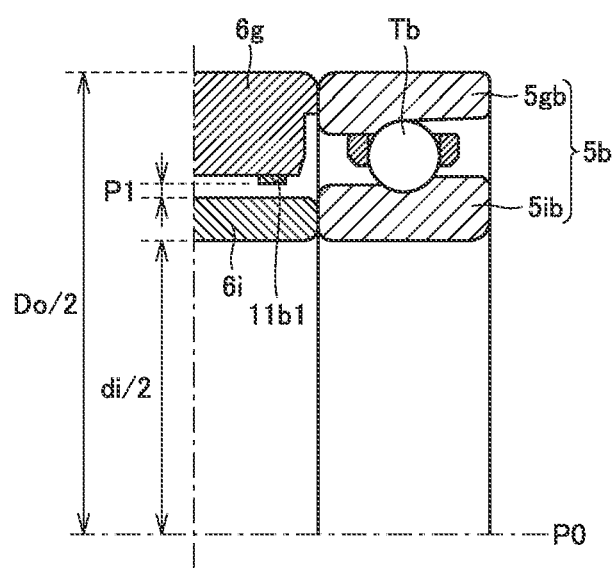
FIG. 8 is a diagram (No. 1) showing exemplary arrangement of the heat flux sensor.
Figure 9:
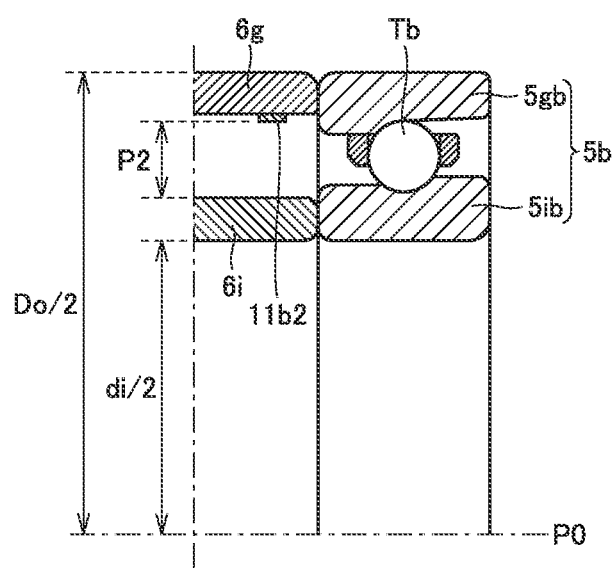
FIG. 9 is a diagram (No. 2) showing exemplary arrangement of the heat flux sensor.

FIG. 8 is a diagram showing exemplary arrangement of a heat flux sensor 11b1 of which distance ΔP1 to outside surface 6iA of inner-ring spacer 6i is equal to or shorter than (Do/2−di/2)×0.25. FIG. 9 is a diagram showing exemplary arrangement of a heat flux sensor 11b2 of which distance ΔP2 to outside surface 6iA of inner-ring spacer 6i is longer than (Do/2−di/2)×0.25. In order to check output sensitivity of each of heat flux sensors 11b1 and 11b2 shown in FIGS. 8 and 9, the present applicant conducted a bearing abnormality occurrence simulation test.

FIG. 10 shows relation between arrangement in the radial direction of each of heat flux sensors 11b1 and 11b2 and output sensitivity of each of heat flux sensors 11b1 and 11b2 that is obtained in the simulation test.

As shown in FIG. 10, regarding heat flux sensor 11b2 (see FIG. 9) of which distance ΔP2 to outside surface 6iA of inner-ring spacer 6i is longer than (Do/2−di/2)×0.25, the relational expression (4) is not satisfied and the heat flux sensor is slightly poor in output sensitivity. This may be because heat flux sensor 11b2 is distant from inner ring 5ib that generates heat and heat from inner ring 5ib is less likely to conduct to heat flux sensor 11b2.

In contrast, regarding heat flux sensor 11b1 (see FIG. 8) of which distance ΔP1 to outside surface 6iA of inner-ring spacer 6i is equal to or shorter than (Do/2−di/2)×4.25, the relational expression (4) is satisfied and it is high in output sensitivity. This may be because heat flux sensor 11b1 is close to inner ring 5ib that generates heat and is able to detect heat generation in inner ring 5ib on the occurrence of abnormality of the bearing earlier (with higher sensitivity).

Heat flux sensor 11b according to the present embodiment is arranged at a position where the relational expressions (3) and (4) described above are satisfied. Therefore, sensitivity of heat flux sensor 11b can be high.

Heat flux sensor 11a according to the present embodiment is also arranged at a position where the relational expressions (3) and (4) described above are satisfied. Therefore, sensitivity of heat flux sensor 11a can also be high. When the relational expressions (3) and (4) described above are applied to heat flux sensor 11a, "P" represents a distance from rotation axis P0 to heat flux sensor 11a and "ΔP" represents a distance from outside surface 6iA of inner-ring spacer 6i to heat flux sensor 11a.

<Arrangement in Circumferential Direction of Heat Flux Sensor>

Figure 11:
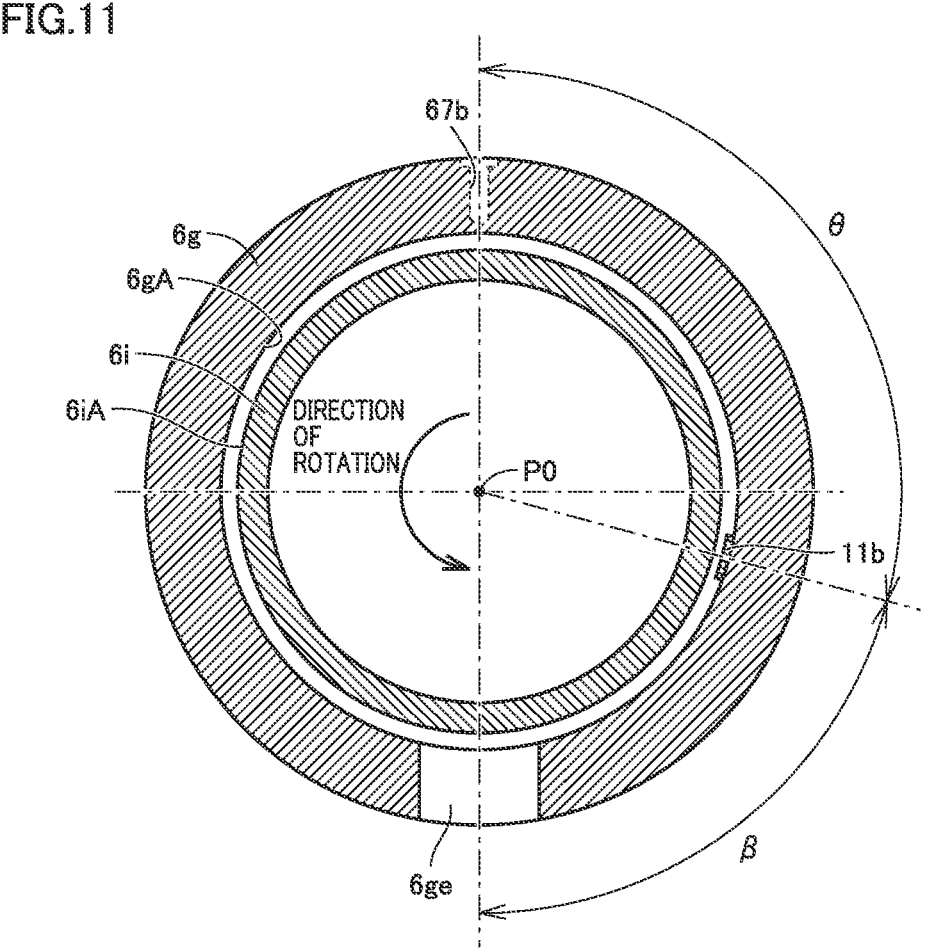
FIG. 11 is a diagram showing exemplary arrangement in a circumferential direction of the heat flux sensor.

FIG. 11 is a diagram showing exemplary arrangement in a circumferential direction (the circumferential direction of rotation axis P0) of heat flux sensor 11b. FIG. 11 is a cross-sectional view along XI-XI in FIG. 2. Heat flux sensor 11b according to the present embodiment is arranged at a position where a relational expression (5) below is satisfied:

$$\theta < -15°, +15° < \theta \quad (5)$$

where "θ" represents an angle of arrangement (an angle from the lubrication nozzle to the center of the heat flux sensor) in the circumferential direction with the lubrication nozzle in lubricating oil supply path 67b being defined as the reference. θ in a clockwise direction is expressed as being positive (+).

Heat flux sensor 11b is preferably arranged on a rear side of the lubrication nozzle in a direction of rotation of inner-ring spacer 6i. Therefore, when inner-ring spacer 6i rotates, for example, counterclockwise (−), heat flux sensor 11b is desirably arranged on the rear side in the counterclockwise direction, that is, within a range of 0° <θ<180°. FIG. 11 shows an example in which angle of arrangement θ is set to approximately 110°.

Furthermore, heat flux sensor 11b according to the present embodiment is arranged at a position where a relational expression (6) below is satisfied.

$$-90° < \beta < +90° \quad (6)$$

where "β" represents an angle in the circumferential direction from the center of an exhaust port 6ge to the center of heat flux sensor 11b. The relational expression (6) means that magnitude (an absolute value) of the angle in the circumferential direction from the center of exhaust port 6ge to the center of heat flux sensor 11b is smaller than 90°. In the example shown in FIG. 11, exhaust port 6ge is arranged such that the center thereof satisfies a condition of θ=180°.

In other words, the lubrication nozzle is provided in a region in outer-ring spacer 6g opposite to exhaust port 6ge.

Figure 12:
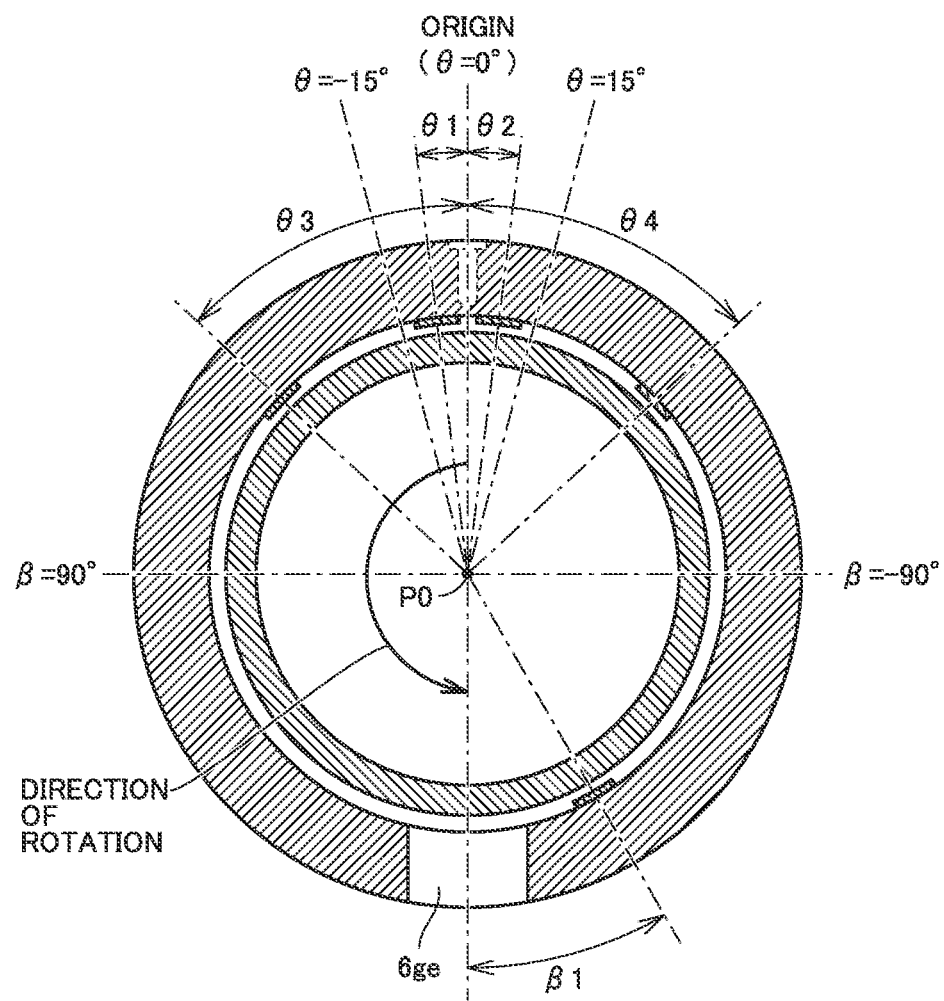
FIG. 12 is a diagram showing exemplary arrangement when arrangement in the circumferential direction of the heat flux sensor is varied.

FIG. 12 is a diagram showing exemplary arrangement when arrangement in the circumferential direction of the heat flux sensor is varied. Specifically, FIG. 12 shows heat flux sensors of which angles of arrangement θ with the lubrication nozzle being defined as the reference are set to prescribed angles θ1, θ2, θ3, and θ4, respectively, and a heat flux sensor of which angle β with the center of exhaust port 6ge being defined as the reference is set to a prescribed angle β1.

Prescribed angle θ1 is set to satisfy a condition of −15°<θ1<0° and does not satisfy the relational expressions (5) and (6). Prescribed angle θ2 is set to satisfy a condition of 0°<θ2<15° and does not satisfy the relational expressions (5) and (6). Prescribed angle θ3 is set to satisfy a condition of −90°<θ3<−15° and satisfies the relational expression (5) but does not satisfy the relational expression and (6). Prescribed angle θ4 is set to satisfy a condition of 15°<θ4<90° and satisfies the relational expressions (5) and (6). Prescribed angle β1 satisfies a condition of 90°<β1<90° and satisfies the relational expressions (5) and (6).

In order to check output sensitivity of each heat flux sensor shown in FIG. 12, the present applicant conducted a bearing abnormality occurrence simulation test.

FIG. 13 shows relation between arrangement in the circumferential direction of each heat flux sensor and output sensitivity of each heat flux sensor that is obtained in the simulation test.

Regarding the heat flux sensor of which angle of arrangement θ1 satisfies the condition of −15°<θ1<0°, the relational expressions (5) and (6) are not satisfied and the heat flux sensor is poor in output sensitivity. This may be because the heat flux sensor is affected by air injected from the lubrication nozzle and affected by the air curtain produced by rotation of inner-ring spacer 6i due to arrangement of the sensor on a front side of the lubrication nozzle in the direction of rotation of inner-ring spacer 6i and hence output sensitivity thereof is lowered.

Regarding the heat flux sensor of which angle of arrangement θ2 satisfies the condition of 0°<θ2<15°, the relational expressions (5) and (6) are not satisfied either and the heat flux sensor is poor in output sensitivity. This may be because output sensitivity is lowered under the influence by air injected from the lubrication nozzle.

Regarding the heat flux sensor of which angle of arrangement θ3 satisfies the condition of −90°<θ3<−15°, the relational expression (5) is satisfied but the relational expression (6) is not satisfied, and the heat flux sensor is slightly poor in output sensitivity. This may be because the heat flux sensor is distant from the lubrication nozzle by 150 or more whereas the heat flux sensor is arranged on the front side in the direction of rotation of inner-ring spacer 6i, and hence it is slightly affected by air injected from the lubrication nozzle and output sensitivity thereof slightly becomes dull.

Regarding the heat flux sensor of which angle of arrangement θ4 satisfies the condition of 15°<θ4<90°, the relational expressions (5) and (6) are satisfied and output sensitivity is high. This may be because the heat flux sensor is less likely to be affected by air injected from the lubrication nozzle and the air curtain produced by rotation of inner-ring spacer 6i and is able to detect heat generation in the bearing on the occurrence of abnormality earlier (with higher sensitivity).

Regarding the heat flux sensor of which angle θ1 with the center of exhaust port 6ge being defined as the reference satisfies the condition of −90°<β1<90° the relational expressions (5) and (6) are satisfied and output sensitivity thereof is highest. This may be because the heat flux sensor is less likely to be affected by air and is provided around exhaust port 6ge where heat tends to be trapped, and hence it is able to detect heat generation in bearing 5b on the occurrence of abnormality earlier (with higher sensitivity).

In the case of grease lubrication, no air flows into the vicinity of the heat flux sensor and hence sensor sensitivity does not become dull even when the heat flux sensor is arranged at any position on the circumference.

<Cooling Structure in Outer-Ring Spacer>

As described above, in the present embodiment, a cooling structure is provided in outer-ring spacer 6g where heat flux sensors 11a and 11b are arranged.

Figure 14:
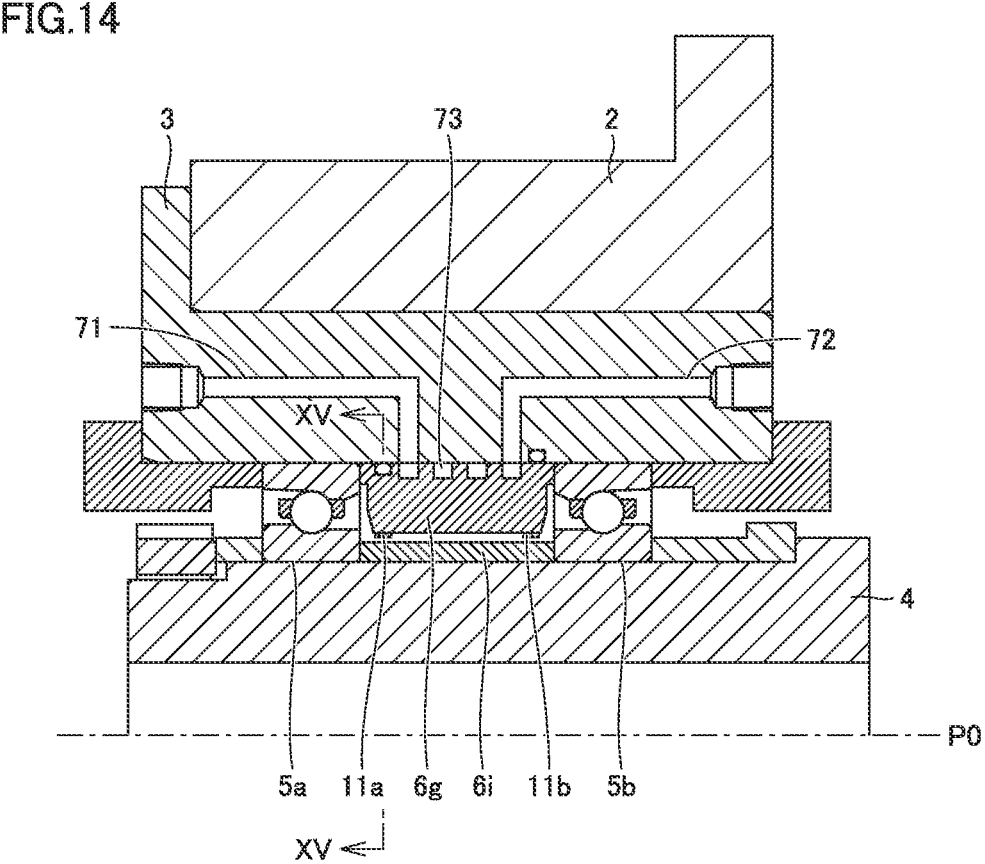
FIG. 14 is a diagram showing an exemplary cooling structure provided in an outer-ring spacer.
Figure 15:
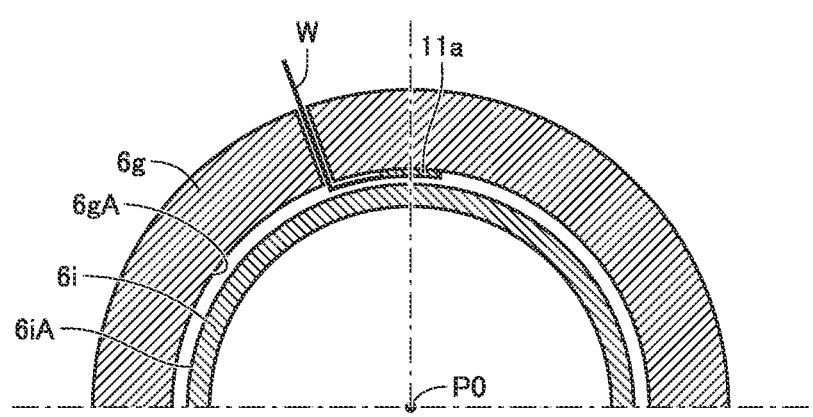
FIG. 15 is a cross-sectional view along XV-XV in FIG. 14.

FIG. 14 is a diagram showing an exemplary cooling structure provided in outer-ring spacer 6g. FIG. 15 is a cross-sectional view along XV-XV in FIG. 14.

As shown in FIG. 14, two cooling medium paths 71 and 72 are provided in housing 3 and a spiral groove 73 is provided in the outside surface of outer-ring spacer 6g. Spiral groove 73 has one end and the other end connected to cooling medium paths 71 and 72, respectively. A cooling medium (oil, water, compressed air, or the like) flows into spiral groove 73 through one of cooling medium paths 71 and 72 and the cooling medium that flows through spiral groove 73 is discharged to the other of cooling medium paths 71 and 72. This spiral groove 73 thus functions as the cooling medium flow channel in outer-ring spacer 6g Heat flux sensor 11a is connected to the outside of outer-ring spacer 6g through a wire W as shown in FIG. 15.

Outer-ring spacer 6g may be provided not only with heat flux sensors 11a and 11b and spiral groove 73 but also a wireless transmitter that transmits data obtained by the sensor to the outside, a self-power generation device that drives the sensor or the wireless transmitter, and a control device where data obtained by the sensor is temporarily stored, the control device including a signal processor that converts data.

[Modification of Arrangement of Heat Flux Sensor]

Figure 16:
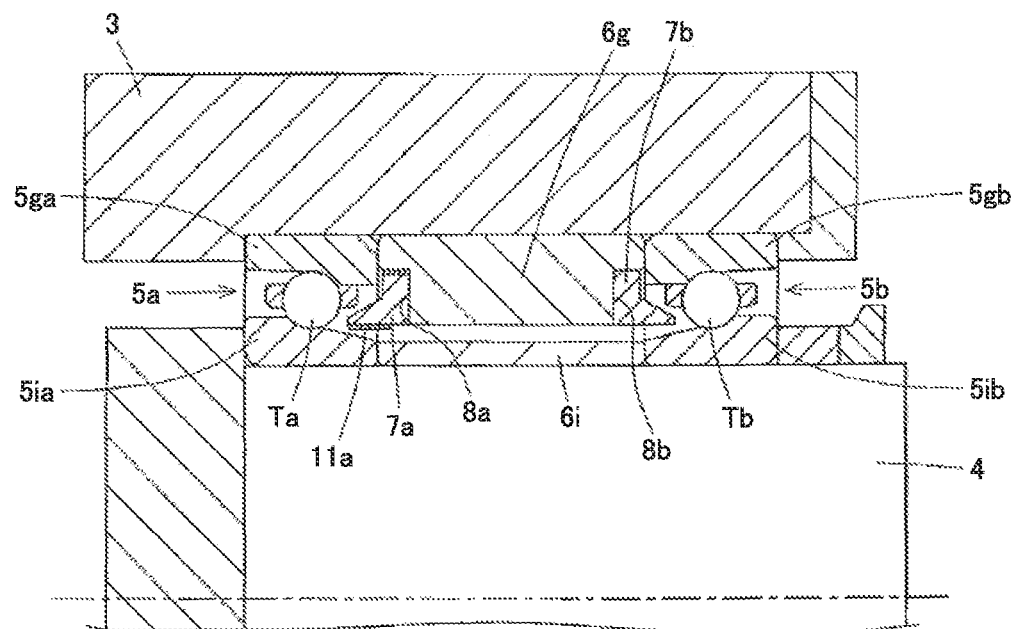
FIG. 16 is a diagram showing a modification of arrangement of the heat flux sensor.

FIG. 16 is a diagram showing a modification of arrangement of the heat flux sensor. In the present modification, as shown in FIG. 16, protrusions 7a and 7b that protrude from respective axial side surfaces into a gap between the inner ring and the outer ring are added in outer-ring spacer 6g on a fixed side, and heat flux sensor 11a is provided in one protrusion 7a. In this case, though not shown, heat flux sensor 11b may similarly be arranged also in another protrusion 7b.

Heat originates from a portion where a bearing ring on the fixed side of a rolling bearing comes in contact with a rolling element. In an example where the heat flux sensor is provided in the bearing ring on the fixed side, high cost for working the bearing ring on the fixed side is a concern. This problem is solved by providing a heat flux sensor in protrusions 7a and 7b of the spacer on the fixed side, and the heat flux sensor can readily be provided. Since heat flux sensors 11a and 11b are provided in protrusions 7a and 7b that protrude into the gap between the inner ring and the outer ring, variation in temperature in the inside of the bearing during operations can directly be detected.

Protrusions 7a and 7b may also serve as nozzles that emit lubricating oil for air-oil lubrication to bearings 5a and 5b. In this case, the heat flux sensor can be provided by making use of an existing nozzle that emits lubricating oil. Therefore, for example, cost can be lower than in an example in which a dedicated component for providing a heat flux sensor is provided.

Figure 17:
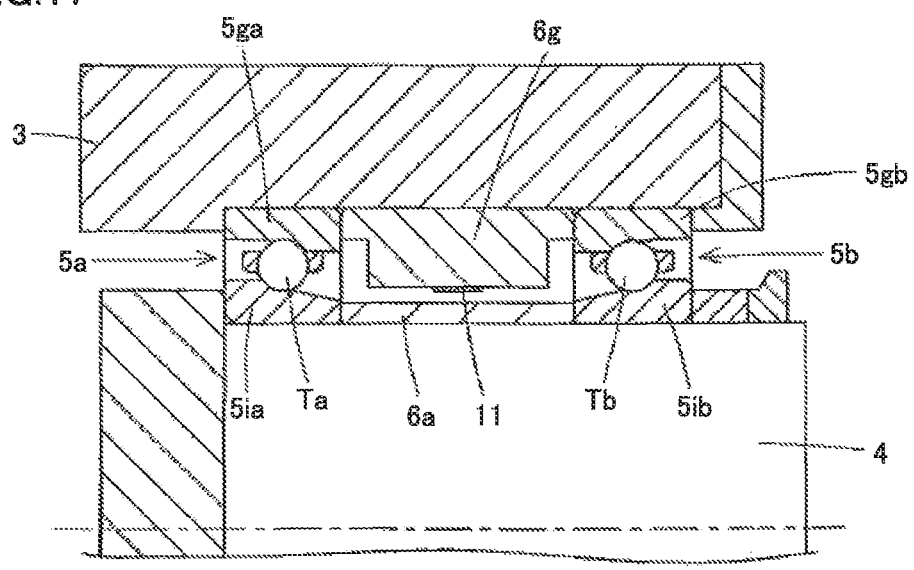
FIG. 17 is a diagram showing another modification of arrangement of the heat flux sensor.

FIG. 17 is a diagram showing another modification of arrangement of the heat flux sensor. FIGS. 1 and 2 show an example in which heat flux sensors 11a and 11b are provided at the end (in the vicinity of bearing 5) of the inside surface of outer-ring spacer 6g in the axial direction. As shown in FIG. 17, however, heat flux sensor 11 may be provided in the central portion of the inside surface of outer-ring spacer 6g in the axial direction.

The heat flux sensor may be arranged in housing 3 or a not-shown front lid, and the cooling structure, the wireless transmitter, the self-power generation device, and the control device may be provided in housing 3 or the front lid.

It should be understood that the embodiment disclosed herein is illustrative and non-restrictive in every respect. The scope of the present invention is defined by the terms of the claims rather than the description of the embodiment above and is intended to include any modifications within the scope and meaning equivalent to the terms of the claims.

REFERENCE SIGNS LIST 1 spindle apparatus; 2 bearing jacket; 3 housing, 4 main spindle, 5, 5a, 5b bearing; 5ga, 5gb outer ring; 5ia, 5ib inner ring; 6 spacer; 6g outer-ring spacer; 6gA inside surface; 6ge exhaust port; 6i inner-ring spacer; 6iA outside surface; 7a, 7b protrusion, 11a, 11b heat flux sensor; 30 bearing apparatus; 67a, 67b lubricating oil supply path; 71 cooling medium path; 73 groove; P0 rotation axis; Rta, Rtb retainer; Ta, Tb rolling element; W wire

The invention claimed is:

1. A bearing apparatus comprising:
a bearing including an inner ring, an outer ring, a rolling element, and a retainer, the bearing rotatably supporting a rotating body around a rotation axis;
a spacer including an inner-ring spacer adjacent to the inner ring and an outer-ring spacer adjacent to the outer ring; and
a heat flux sensor provided in one of the spacer and a component around the bearing, wherein
a distance in a direction along the rotation axis from a center of the bearing to a center of the heat flux sensor is longer than 0.5 time and shorter than one time of a dimension of the bearing in the direction along the rotation axis.

2. The bearing apparatus according to claim 1, wherein
a distance in a radial direction of the rotation axis from an outside surface of the inner-ring spacer to the heat flux sensor is equal to or shorter than 25% of a distance between an inside surface of the inner-ring spacer and an outside surface of the outer-ring spacer.

3. The bearing apparatus according to claim 1, wherein
the heat flux sensor is provided in an inside surface of the outer-ring spacer,
the outer-ring spacer is provided with an exhaust port for exhaust of air-oil for lubrication, and
magnitude of an angle in a circumferential direction of the rotation axis from a center of the exhaust port to the center of the heat flux sensor is smaller than 90°.

4. The bearing apparatus according to claim 3, wherein
the outer-ring spacer is provided with a nozzle that injects the air-oil, and
the nozzle is provided in a region in the outer-ring spacer opposite to the exhaust port.

5. The bearing apparatus according to claim 1, wherein
the outer-ring spacer is provided with a cooling medium flow channel.

6. The bearing apparatus according to claim 1, wherein the rotating body is a main spindle of a machine tool.

7. A bearing apparatus comprising:
a bearing including an inner ring, an outer ring, a rolling element, and a retainer, the bearing rotatably supporting a rotating body around a rotation axis;
a spacer including an inner-ring spacer adjacent to the inner ring and an outer-ring spacer adjacent to the outer ring; and
a heat flux sensor provided in one of the spacer and a component around the bearing, wherein
a distance in a radial direction of the rotation axis from an outside surface of the inner-ring spacer to the heat flux sensor is equal to or shorter than 25% of a distance between an inside surface of the inner-ring spacer and an outside surface of the outer-ring spacer.

8. A bearing apparatus comprising:
a bearing including an inner ring, an outer ring, a rolling element, and a retainer, the bearing rotatably supporting a rotating body around a rotation axis;
a spacer including an inner-ring spacer adjacent to the inner ring and an outer-ring spacer adjacent to the outer ring; and
a heat flux sensor provided in one of the spacer and a component around the bearing, wherein
the heat flux sensor is provided in an inside surface of the outer-ring spacer,
the outer-ring spacer is provided with an exhaust port for exhaust of air-oil for lubrication, and
a magnitude of an angle in a circumferential direction of the rotation axis from a center of the exhaust port to a center of the heat flux sensor is smaller than 90°.

* * * * *